United States Patent [19]

Carter et al.

[11] Patent Number: 5,016,673

[45] Date of Patent: May 21, 1991

[54] FLOW SELECTOR DEVICE

[75] Inventors: William Carter, Indianapolis; David A. Meadows, Danville; Jay L. Hayes; John S. Voege, both of Indianapolis, all of Ind.

[73] Assignee: Puritan-Bennett Corporation, Overland Park, Kans.

[21] Appl. No.: 214,488

[22] Filed: Jul. 1, 1988

[51] Int. Cl.⁵ ................... F16K 3/32; F16K 51/00
[52] U.S. Cl. .......................... 138/45; 138/46; 251/205; 251/206
[58] Field of Search ............... 138/89, 45, 46; 137/625, 22; 251/205, 206, 207, 208, 209

[56] References Cited

U.S. PATENT DOCUMENTS

| | | | |
|---|---|---|---|
| 2,382,323 | 8/1945 | Lornitzo | 137/625.22 |
| 3,424,184 | 1/1969 | Brimley et al. | 137/625.22 |
| 4,027,698 | 6/1977 | Weinhold | 137/625.22 |
| 4,724,869 | 2/1988 | Carter | 138/45 |

Primary Examiner—James E. Bryant, III
Attorney, Agent, or Firm—Robert A. Spray

[57] ABSTRACT

A flow selector device whose fluid flow is regulated by the rotational setting of a rotor body in a housing; and although the metering passageways have outlets spaced from the axis of the rotor and its manipulating shank, other passageways are provided in the housing, which channel the fluid then to an outlet in and concentric with the rotor and its flow-rate adjustment shank. One of those other passageways is an annular groove formed into the rotor's manipulating shank, leading to a radial passageway in the shank, thus carrying fluid to the shank outlet channel regardless of the rotational setting of the rotor. Another of those other passageways is in the housing; and its provision is facilitated by forming it to open onto an outer face-portion of the housing, then sealing the outer portion of the passageways by a ball member forced into the outer end of the passageway. The rotor is held axially of the rotor by a snap ring, and by a nylon ring between the snap ring and the housing.

30 Claims, 2 Drawing Sheets

Fig. 3

FLOW SELECTOR DEVICE

FIELD OF THE INVENTION

The present invention relates to a flow selector or fluid-metering device, and more particularly the invention provides a flow selector device having novel and advantageous particular features even though in basic and general appearance and overall operativity, and even though in type and function, it resembles flow selector devices of the prior art.

That is, the flow selector device of the present invention is of a type whose metering is achieved by the rotation of a rotor assembly in a housing, thereby to present a selected one of a ring of variously-sized orifices to a non-axial housing station or channeling; and such is the nature of prior art flow selector devices cited herein.

Such prior art flow selector devices indeed have several features which are used in and are a characteristic of flow selector devices of the present invention, including the assembly of housing and rotor, with the ring of metering orifices being concentric to the axis of the housing and rotor; and the metering is done by presenting a selected one of the metering orifices to a non-axial metering station into which the metered fluid passes or flows at a non-axial location; and even the production of the metering-operative sizing of the metering orifices, as done and here shown by a prior art technique of forcing a ball to a selected but limited amount into a position which uses its presence to achieve the certain openness of a metering channel to achieve the metering-effective orifice size, is a prior art technique here used. Moreover, the channel indexing means are also of the prior art, as is the sealing of the rotor at the metering station.

With such flow selector devices, the present invention provides novel and advantageous features, as are illustrated by the drawings and as are explained herein, useful as individual features although particularly more so in their overall combination with one another and with the features of this type of flow selector device in which they are embodied.

THE PRESENT INVENTION SUMMARIZED

Building upon, although differing significantly from the prior art as shown below, the present invention provides and achieves the following features of novelty in a flow control or metering device in which the optionally-selected flow rates are obtained by varying the rotational setting of a rotor assembly, which presents a selected one of a non-axial series of metering orifices to a non-axial outlet channel:

a. Axial dispensing, i.e., dispensing out the axis of the rotor assembly's control shaft even though the optional metering requires non-axial channeling;

b. A transition channel communicating the non-axial metering channeling of the housing with axial dispensing channeling of the rotor shaft;

c. Advantageous means of providing the transition channel by providing a hole extending radially through the housing to the rotor shaft, then forcing a ball into the hole from the exterior of the housing, the hole having a shoulder radially outwardly of the metering channel, which blocks inadvertent driving of the ball so far inwardly as would block the metering channel route;

d. Fluid-communication means for the transition channeling, including an annular groove on the face of one of the housing and rotor, providing the fluid-communication to the rotor shaft regardless of its relative rotation, and with sealing means on both axial sides of the annular groove to make the transition channeling fluid-tight even though there is needed to be a rotatability of the housing and rotor shaft; and e. Compression means on the rotor shaft for retaining the relatively movable interconnection of the housing and rotor assembly, by blocking the rotor assembly from moving in a direction relative to the housing which is urged by the prior art's indexing means and meter-station sealing means, the compression means including a nylon disk having lubricating properties.

PRIOR ART AS EMPHASIZING THE INVENTIVE NATURE OF THIS INVENTION

Probably the closest specific prior art with respect to the basic structure as improved by the present invention is a flow selector device of one of the present inventors, that being U.S. Pat. No. 4,724,869 issued Feb. 16, 1988, to William Carter, and the devices of two U.S. patents issued to Clayton B. Voege, those being U.S. Pat. No. 4,241,896 of Dec. 30, 1980, and U.S. Pat. No. 4,366,947 of Jan. 4, 1983.

An overall and superficial resemblance to all of them is not only conceded but emphasized, for the present invention provides improvements over them and their concepts, and it is those improvements in the setting of the overall device by which the inventiveness here is shown; and it is upon that prior art and other prior art mentioned below that the present invention builds. For further illustration of basic relation to, and building upon the prior art, at least as long as of 1934, a rotary disk metering valve, with a ring of variously-sized metering orifices concentric (non-axial) about the axis of the rotatable element as the outlet station, is shown in the U.S. Pat. No. 1,982,754 issued to B. L. Peterson on Dec. 4, 1934.

However, the present invention's differences, both structurally and conceptually, over those representatives of the prior art are herein shown to be of inventive nature, as will become apparent as the following details and features of significant difference are pointed out, and are now considered more specifically as to nature and effect.

That is, as perhaps the easiest-recognized distinction over the prior art, it will be noted that the Peterson device has its outlet (25) non-coaxial as to the axis of the orifice-containing metering valve-plate, whereas the three later ones of the prior art have their discharge outlets emerging from a side face of the housing body; and there is thus no suggestion in those prior art devices or patents of the present provisions or concepts to provide the discharge co-axial with the rotor axis of the rotor's flow-regulation shaft, nor do those prior art representatives provide any suggestion of such a distinct difference nor as to the several and co-operative adaptations for achieving it as described herein.

Further, these prior art representatives do not show or suggest the type of rotor shaft retention here provided, by which, by a snap ring and a nylon washer, the rotor assembly is blocked from travelling outwardly of the housing body as urged by the compression effect inherent in the detent or indexing feature and the sealing details.

Still further, the prior art provides no showing or suggestion of the facilitation of an internal passageway by simply forcing a ball, from the exterior of the housing, into the outer end of a passageway which opens out onto the outer portion of the body; and this lack of showing or suggestion is in spite of the fact that the Voege reference U.S. Pat. No. 4,366,947 uses balls driven part-way into passageways as metering bodies.

Moreover, none of the prior art shows or suggests the provision of a shoulder in that internal passageway, assuring against inadvertently driving the sealing ball too far as would block the metered-fluid channel.

In a hindsight consideration of the present invention to determine factors of its inventive and novel nature, it is also not only conceded but emphasized that the prior art had details usable in this invention if the prior art had had the guidance of the present invention's concepts.

That is, it is emphasized that the prior art had several particulars; but the prior art failed to take advantage of them to build upon them and achieve the invention, as to be noted in several particulars as now shown:

a. The prior art has had internal passageways of various directions. However, as to the concept of a transverse or transition passage to permit an advantageous axial outlet of metered fluid, the prior art has apparently either considered it not possible, or else did not consider it at all; for optional-rate fluid metering has long been by a concentric or off-axis ring of variously-sized metering orifices such as shown by way of prior art illustration in the Peterson patent of 1934, which have forced the metering station and internal passage of metered fluid to be non-axial. Thus, the present invention's achievement of axial dispensing is not only non-suggested but against the trend of the prior art ever since; and the inventive nature of this feature is emphasized by various hydraulic devices having transverse passages which hindsight shows could have been used except for the lack of the present concepts.

b. Further showing the inventive nature of the overall invention, passage plugs are known in the prior art to seal passages which are advantageously formed to extend fully to the exterior of a body member which contains fluid passages. Yet, perhaps feeling wedded to non-axial dispensing because of non-axial metering illustrated by the cited patents, the prior art failed to conceive the feature of a passage-plugging ball, even though closely adjacent to the metering outlet the Voege U.S. Pat. No. 4,366,947 showed a ball as forced into a recess for a metering effect, but that was for a desired openness, not a full blocking; and a full blocking would have destroyed its intended metering function and operativity.

c. The prior art has had annular grooving on hydraulic devices, providing fluid flow fully around a component; but the prior art has never suggested annular grooving in a combination by which could be made effective a radially-extending transition path in a flow selector device having a non-axial metering station and thus achieving an axial dispensing out a control shaft of the rotor assembly; and especially the prior art has failed to show sealing rings on both axial sides of an annular groove to provide sealing which makes a transition path or channel workable to achieve dispensing axial of the rotor's control shaft.

d. The prior art has had all sorts of snap rings, washers, discs, etc., but never has shown the use of a nylon disk, as backed by a snap ring to achieve both the blocking of axial movement of a rotor assembly and easy turning of the rotor even though compression means of the device urge the rotor assembly axially of the housing.

Thus, the prior art in this field is not only acknowledged, it is emphasized; for it helps to show by its very diversity and even its approach to the present features in this general type of flow selector device, that although the prior art has recognized the desire of an advantageous flow selector device, and although there have been many years and the many attempts throughout those years, and in spite of the problem and need for effective flow selector devices which are economical, easy to assemble, and effective for their task and duty, nevertheless, none has provided nor suggested the simplified and advantageous concepts and construction features which characterize the present invention, and by which this invention has been achieved.

Accordingly, the various concepts and components are conceded and emphasized to have been widely known in the prior art; nevertheless, the prior art not having had the present concepts in combination, even only a fair amount of realistic humility, to avoid consideration of this invention improperly by hindsight, requires the concepts and achievement here of the combination to be realistically viewed as inventive in their nature.

BRIEF DESCRIPTION OF THE DRAWINGS

The above description is of somewhat introductory and generalized form. More particular details, concepts, and features are set forth in the following and more detailed description of an illustrative embodiment of a flow selector device embodying the invention and the inventive concepts, taken in conjunction with the accompanying drawings.

In the drawings.

DETAILED DESCRIPTION OF PREFERRED EMBODIMENT

As shown in the drawings, the invention provides an advantageous flow selector device 10 particularly useful and desirable for supplying a desired rate of flow of a fluid.

The external housing or shell for the device 10 as shown is a housing body means 12; and as shown in the drawings the gas flow is upwardly through the housing 12's inlet means 14 and eventually out the dispenser's outlet means 16. (The inlet 14 and outlet 16 may be provided with means for connection of associated fittings or conduits (not shown); and in the form shown, the outlet 16 is on a nipple 18 surfaced with retainer lugs 20, and the inlet means 14 is shown as a cylindrical collar or sleeve 21 provided with an inwardly-facing annular groove 22 to receive an O-ring (not shown) for fluid-tightness.)

The rate of flow is controlled by a rotor body means 24, it being manipulatable by a control knob 26 connected by a set screw 28 to a shaft 30 of the rotor body means 24; and the rotor body means 24 is supported by the housing body means 12 in a bore 31 thereof so as to be rotationally movable with respect to the housing body 12.

(The metering head 31a of the rotor body 24 is shown as formed as a separate piece from the rotor shaft 30; but since they are fixed together at their joining faces 32 and 33, they are here considered as a single piece, although components and features of the rotor shaft 30 are generally mentioned herein as of the shaft 30 rather than of the overall rotor assembly 24.)

The above are the components of the device 10 as most easily seen externally; and now the internal parts will be specified, first being that of the optional attainment of various flow rates, generally as per the prior art cited.

That is, with respect to flow metering, it is to be noted first that the rotor body means 24 is provided with a transversely extending face 34 and a plurality of passageways 36 extending axially through the rotor body means 24, each of said passageways having a side inlet port 38 cut in a sidewall of the rotor 24, and an outlet 40, the side inlet port 38 of all of such passageways 36 being open to the housing body means' inlet means 14 and the outlet 40 of each of the passageways 36 being open to the rotor face 34. This is a ball-controlled fluid-metering of the cited U.S. Pat. No. 4,366,947, and metering otherwise per the cited U.S. Pat. No. 4,724,869. That is, as diagrammatically indicated by the difference in the height of the metering balls 42 driven into passageways 36, thus a difference in the effective opening of all the similarly sized ports 38 permitting fluid flow to each of the passageways 36 in FIG. 2, the difference in fluid flow to achieve the desired flow rate out the outlet 16 being diagrammatically shown merely by those ball-height differences in FIG. 2, for that is not a part of the present invention.

The outlet 40 of only one of the metering passageways 36 is registrable as, e.g., in the cited U.S. Pat. No. 4,724,869, with the upstream end 44 of a housing body 12's intermediate outlet means 46 in any particular rotational setting of the rotor body means 24 with respect to the housing body 12, even though the outlet 40 of all the metering passageways 36 opens to the transverse rotor face 34. As per that U.S. patent just cited, the housing's intermediate outlet passage 46 and its upstream or inlet end 44 are offset from the axis of the housing 12 and rotor 24, and thus the inlet 44 and housing passage 46 receive fluid from only one of the passageways 36, thus to deliver through the housing's intermediate outlet 46 only the fluid rate, as permitted by a single chosen one of the passageways 36, by the inter-related features of support (further detailed herein) of the rotor body means 24, and the rotor body 24 itself, and the rotor face 34 being such that the rotor face 34 is in axial alignment with the upstream inlet opening 44 of the housing 12's intermediate outlet means 46 regardless of the rotational setting of the rotor body means 24, even though only a particular one passageway outlet 40 can be in registry with the housing outlet 46's inlet 44.

Departing now from the prior art as to components and concepts, next will be described the means and concept of advantageously providing the dispensing from the device 10 to be along the axis of the flow-controlling shaft 30 of the rotor 24, even though the rotor's shank 30 which as noted extends outwardly of the housing body 12 and is operatively concentric with the axis of rotation of the rotor body 24 itself and of the housing 12, and even though the downstream end 48 of the housing 12's intermediate outlet means 46 is at an offset location with respect to those axes.

Figure 2:
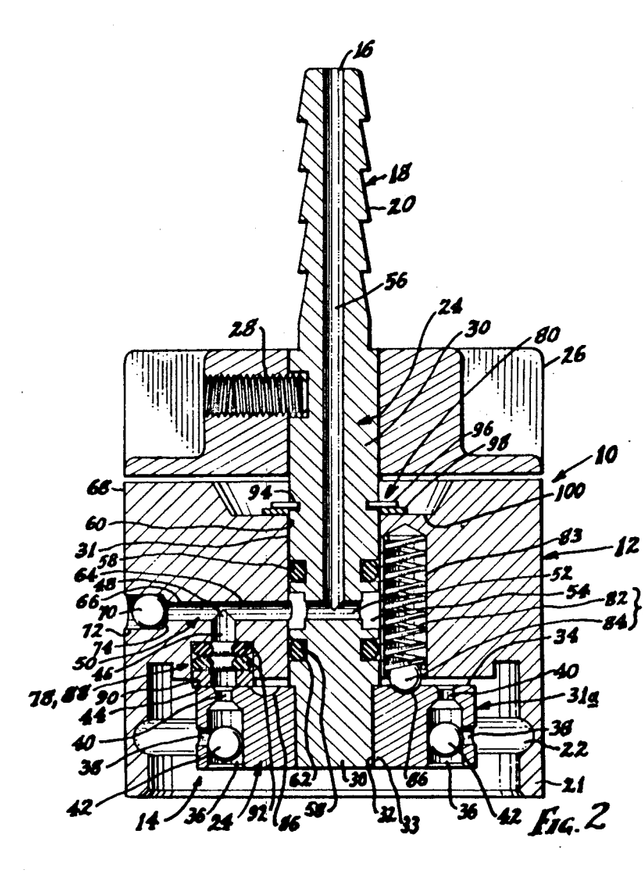
FIG. 2 is an assembly view, generally in axial cross-section, of the device shown in FIG. 1.

As shown for this attainment, and as illustrated in FIG. 2, the housing 12 is provided with a housing body means' intermediate passageway means 50 transversely extending in the housing body means 12 and communicating with the downstream end 48 of the housing body means' intermediate outlet means 46.

Figure 1:
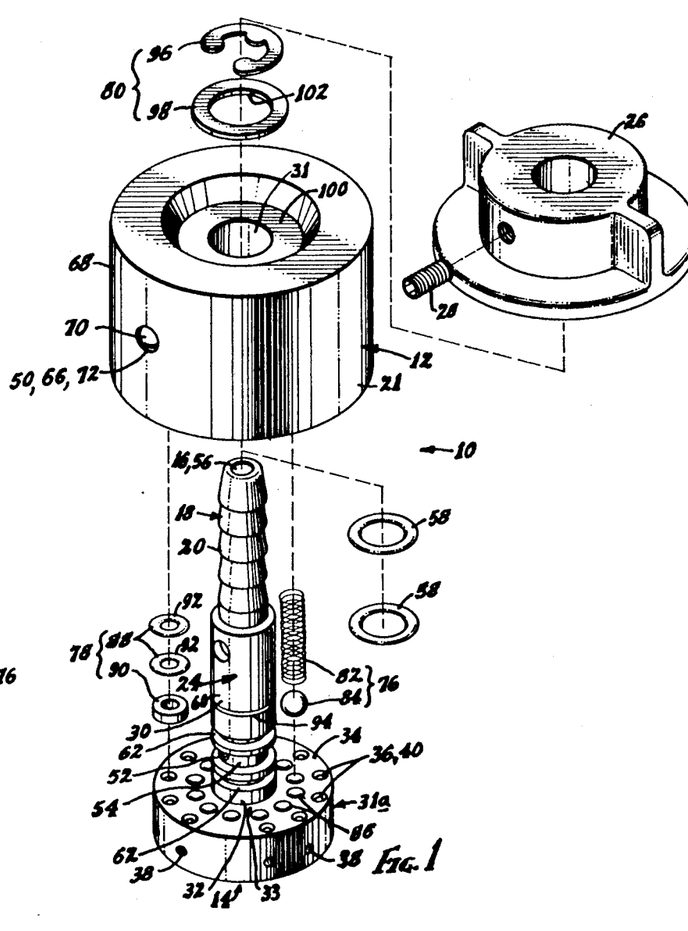
FIG. 1, a so-called "exploded view" of isometric nature, is for showing of the components of a flow selector device of an illustrative embodiment, its "exploded" components being shown as inter-related by broken lines, along which the components would move into the assembly of FIG. 2, as is the nature of an "exploded view"
Figure 3:
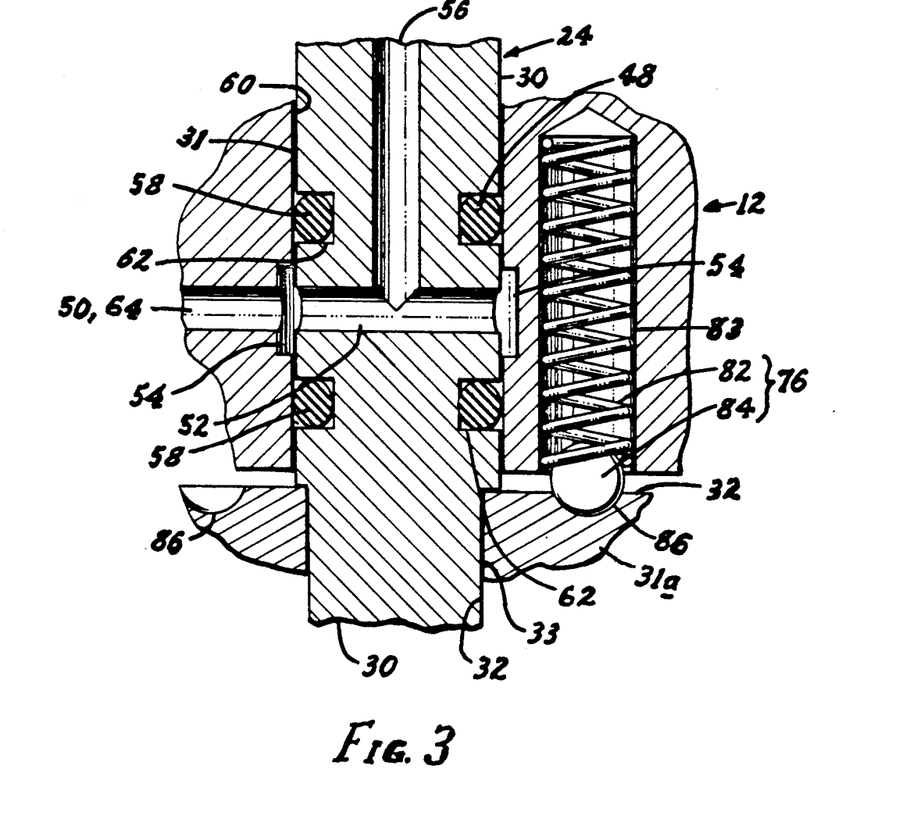
FIG. 3 is a fragmental detail view of an embodiment like that of FIGS. 1 and 2 except that an annular groove is provided in the housing body rather than in the rotor shank, and in a scale larger than that of FIG. 2.

Also, the rotor shank or shaft 30 is shown provided with a shank means' intermediate, passageway means 52 transversely extending in the shank means 30; and one of the housing body means 12 and the shank means 30 (here in FIGS. 1 and 2 the shaft 30, and in FIG. 3 the housing body 12) is provided with circumferentially-extending annular groove means 54 operatively communicating the housing body means' intermediate passageway means 50 with the shank means' intermediate passageway means 52 regardless of the rotational position of the rotor body 24, and of its shaft 30 and its shank means' intermediate passageway means 52.

Further (FIG. 2) the rotor shank means 30 is shown provided with a longitudinally extending outlet passageway 56 operatively concentric with the rotor shank means 30 and the rotor body means 24, intersecting the rotor's transverse passageway 52 and extending to the device outlet 16, and thus providing the outlet 16 for the flow selector device 10 advantageously operatively concentric with respect to the axis of rotation of the rotor body 24 itself.

Preferably as shown the annular groove means 54 is fully circumferentially continuous.

Also, as shown, a pair of seal means 58 are provided between and operatively sealing the adjacent face 60 of the shank means 30 and the face 31 of the housing body 12, one on each side of the annular groove means 54; and at least one and preferably both of the seal means 58 is/are provided by providing an annular groove 62 in the periphery of the shank means 30, and providing the seal 58 as a resilient O-ring seated in the groove 62, all as schematically shown in the drawings.

Another advantageous concept (especially noted by FIG. 2) are the concepts of the formation and sealing of the housing body means' intermediate passageway 50 from opening exteriorly.

As shown in FIG. 2, the passageway 50 is provided by a radial hole, and although its fluid-flow portion is only that portion 64 radially inwardly of its intersection 48 with the housing's intermediate longitudinally-directed hole 46, the housing's transverse hole 50 continues straight and radially outwardly, by a hole-portion 66 extending to the outer face 68 of the housing body means 12.

Further as shown, a ball 70 is forced or pressed into the hole-portion 66 from exteriorly of the housing outer face 68, thus operatively sealing the hole 66 (quite in contrast to a metering function of the balls 42 in passageways 36) and thus blocking passage of any fluid flowing from the downstream end 48 of the housing body's intermediate outlet means 46 into the housing body means' intermediate passageway means 50, except as fluid may flow to and in the housing body means' intermediate passageway 50's inner hole-portion 64 for delivery out the housing's outlet portion 64 of passageway 50, for communication to the shank-groove 54 and shank hole 52 and then to shank-hole 56 and outlet 16.

More particularly as shown, the housing body means' intermediate passageway means hole 50 is provided, in its extremely outer portion 72, i.e., the outer portion of the outer hole-portion 66 most adjacent the outer face 68 of the housing body 12, to be enlarged at an outwardly-facing hole shoulder 74 located inwardly of the housing body's outer face 68; and the ball 70 is preferably driven inwardly along the extreme outer hole-portion 72 until the ball 70 is seated against the shoulder 74, although with a force fit of the enlarged ball 70 in hole 72 there is likely to be a full seal even without engagement of the ball 70 with the shoulder 74.

It will be noted that the shoulder 74 is radially outwardly, in housing-hole 50, of its intersection with the downstream end 48 of the housing body 12's intermediate axially-extending outlet means 46; and thus the shoulder 72 blocks inadvertent driving of the ball 70 so far inwardly in the housing-hole 50(66) as would block fluid-flow in hole 50 inwardly toward the outlet of inner hole-portion 64, i.e., as would block flow from housing passage 46 through the inner hole-portion 64 downstream of the intersection 48 of those passages. This is an advantage of the size of the ball 70 and outer hole-portion 72 being larger than hole-portion 64 of hole 50, and thus an advantage of the presence of a shoulder 74 whether or not the ball 70 is driven to seat against the shoulder 74.

Now will be described the means for holding the rotor body means 24 axially with respect to the housing body means 12.

As shown, and as described below, this holding means includes two sets 76 and 78 of compression means carried by the housing body means 12, operatively engageable with and pushing the rotor body means 24 in an upstream direction, and also compression means 80 carried by the shank means 30 operatively engageable with the housing body means 12, blocking the axial extent to which the rotor body means 24 can move in that upstream direction, i.e., blocking the rotor 24's downward movement as shown.

One of the compression means 76 tending to push the rotor 24 axially in an upstream direction (downward as shown) is an indexing detent means 76 which is operative between the housing body 12 and the rotor body 24. As shown, the detent means 76 is shown as a spring 82 carried in a housing bore 83, and a detent ball 84, there being an annular series of recesses 86 cut in rotor face 34 for controlling the rotational position of the rotor 24 to assure it to be in only a position of registry of only a single passageway port 38 or an "off" position; but its spring-urge nature causes it to have (downward) effect of urging the rotor body 24 axially of the housing body 12, that axially-urging effect being a compression means effect which is restrained by the compression means 80, as mentioned above but still to be described.

The other compression means 78, whose axial-moving effect on the rotor in 24 is in an upstream (downward) direction, which is restrained by the compression means 80 still to be described, is a seal means 88 at the upstream end 44 of the housing 12's outlet means 46 and which presses sealingly toward and against the face 34 of the rotor body means 24. In the form shown, the sealing contact body of the seal 88 at the contact end 44 of housing hole 46 against the rotor face 34 is provided by a ring-shaped body 90, and its sealing force or pressure is caused by an axially-stacked pair of O-ring means 92 carried by the housing body 12 adjacent the upstream end 44 of the housing's outlet means 46; and it is the compressive force of those O-ring means 92 carried by the housing body 12 which is restrained by the compression feature 80 now to be described.

The compression means 80, which advantageously block the upstream-urging (downward-urging) effect of the two compression means 76 and 78 will now be described.

As shown, the compression means 80 is carried by the rotor's shank means 30, and comprises the provision of an annular groove 94 in the shank means, and a snap ring 96 seated in the groove 94, and as supported by the snap ring 96, there is shown an operatively lubricative ring member 98 sleeved on the shank means 30 between the snap ring 96 and the adjacent (upper) portion 100 of the housing body means 12, the ring 98 being preferably provided from nylon as a disc having a central aperture 102 large enough to be slid onto the rotor shaft 30.

BRIEF OPERATIONAL REVIEW

The plurality of features which are provided contribute individually and jointly to the novelty and overall desirability of a flow selector device.

Axial outlet 56/16 of the metered fluid is achieved, even though using metering with prior art concepts of a series of variously-sized metering stations which by their non-axial location force the route 46 of the fluid being metered to be offset from the axis of the rotor 30/24 and housing 12, by providing a transverse connection or transition passageway 50 of the housing 12 opening fully to the housing exterior 68, but sealing the exterior opening 72 by a sealing plug which is advantageously provided by a ball 70 as the hole-plug, and with an outwardly-facing shoulder 74 which assures that the ball will not be inadvertently driven so far as to block the flow-channel 50/64.

The rotor's control shaft 30 is provided with a circumferential groove 4, accepting the metered fluid from hole 50/64 regardless of the rotation position of the rotor 24/30 as used for the desired fluid-metering, and that groove 4 is flanked on both sides, axially of the groove 4 by seal rings 58, to assure sealing of the faces 31/60 of the housing and rotor shaft and thus accuracy of the metering.

A novel compression means holds the rotor 24 axially in the housing 12, taking advantage of prior art indexing and sealing incidents both of which urge the rotor assembly 24 in an upstream direction, by an economical feature of compression nature which blocks the rotor assembly shaft 30 of rotor assembly 24 from moving in that direction, in a preferred form being here a snap ring 96 and a nylon disk 98.

CONCLUSION

It is thus seen that a flow selector device, constructed and used according to the inventive concepts herein set forth, provides novel concepts of a desirable and advantageous device, yielding the advantages of a liquid metering device which provides good reliability, ease of assembly, economy, and ease of maintenance, and is conceptually significantly different from the prior art even though flow selector devices having many features of similarity have been known for years; yet significantly this particular combination of features has not been suggested by the prior art, this achievement being a substantial and advantageous departure from prior art, even though the prior art shows attempts at improvement for many years. And particularly is the overall difference from the prior art significant when the non-obviousness is viewed by a consideration of the subject matter as a whole, as integrally incorporating the features different from the prior art, in contrast to merely those details of novelty themselves, and further in view of the prior art teaching away from the particular and inter-related concepts and features of the present invention, and in view of the achievement of axial dispensing by a device having non-axial fluid-metering channels.

In summary as to the nature of these advantageous concepts their inventiveness is shown by novel features of concept and construction shown here, in novel and advantageous combination, not only being different from all the prior art known, but because the achievement is not what is or has been suggested to those of ordinary skill in the art, especially realistically considering this as comprising components which individually are similar in nature to what is well known in manufacturing of hydraulic devices and flow selector devices in particular, and in usefulness which could have been a full motivation to users and manufacturers of this type of equipment. Yet, realistically observed, no prior art has suggested the modifications of any prior art to achieve the novel concepts here achieved, with the various features providing economy, and good operativity and effectiveness.

Accordingly, it will thus be seen from the foregoing description of the invention according to this illustrative embodiment, considered with the accompanying drawings, that the present invention provides new and useful concepts of a novel and advantageous flow selector device having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. And although the various features of novelty are to be noted as particularly desirable in overall combinations, they are individually of advantage as individual concepts and features; for whether considered individually or in factors of combination they build upon prior art concepts by advantageous and novel ways and concepts which are not suggested nor obvious from the prior art in this field.

What is claimed is:

1. A flow selector device, comprising, in combination, a housing body means provided with an inlet means and an outlet means, and an intermediate outlet means intermediate the inlet means and the outlet means, the said housing body means' intermediate outlet means having an upstream end and a downstream end, each of the said upstream end and downstream end having an opening, a rotor body supported by the housing body means to be rotationally movable with respect thereto, and there being means holding the rotor body axially with respect to the housing body means, the support of the rotor body being such as to provide an optionally selectable setting of a plurality of optionally selectable rotor body settings, each of the settings providing a certain flow of fluid from the intermediate outlet means of the housing body means;

a selector control for rotating the rotor body about a rotor body axis in rotational movement relative to the housing body means to an optionally selected one of the plurality of rotor body settings to achieve optionally-desired flow from the intermediate outlet means of the housing body means, the rotor body being provided with a face extending transverse to said rotor body axis, and with a plurality of passageways extending in the direction of the said rotor body axis, through the rotor body, and each of said passageways having an inlet and an outlet, the inlet of all of such passageways being open to the housing body means' inlet means but the outlet of only one of such passageways being registrable with the upstream end of the housing body means' intermediate outlet means in any particular rotational setting of the rotor body with respect to the housing body means, although the outlet of all said passageways open to said rotor body face, the support of the rotor body, and the rotor body, and the rotor body's said face, being such that said rotor body's face is in axial alignment with the upstream end's opening of the intermediate outlet means of the housing body means, regardless of the rotational setting of the rotor body, even though at any setting of the rotor body only a particular one of the passageway outlets can be in registry with the upstream end's opening of the intermediate outlet means of the housing body means, the rotor body including a shank extending outwardly of the housing body means and operatively concentric with the axis of rotation of the rotor body, the downstream end of the housing body means' intermediate outlet means being at an offset location with respect to said rotor body axis, the housing body means being provided with a housing body means' passageway extending in the housing body means transversely to the said rotor body axis, and communicating with the downstream end opening of the housing body means' intermediate outlet means, and providing the outlet means for the housing body means, the shank being provided with a passageway extending in the shank and transversely to the rotor body axis, one of the housing body means and the shank being provided with a circumferentially-extending annular groove operatively communicating the housing body means' said passageway with the shank's said passageway regardless of the rotational position of the rotor body and the shank's said passageway, and the shank is provided with an outlet passageway communicating with the shank's said transversely-extending passageway and operatively concentric with the shank and the rotor body, and the rotor body's axis of movement, and providing an outlet for the flow selector device operatively concentric with the axis of rotation of the rotor body.

2. The invention as set forth in claim 1, in a combination in which the annular groove is fully circumferentially continuous.

3. The invention as set forth in claim 1, in a combination in which the shank is the one which is provided with the said annular groove.

4. The invention as set forth in claim 3, in a combination in which the annular groove is fully circumferentially continuous along the periphery of the said shank.

5. The invention as set forth in claim 1, in a combination in which a pair of seals are provided between and operatively sealing the adjacent faces of the shank and the housing body means, one on each side of annular groove.

6. The invention as set forth in claim 5, in a combination in which at least one of the seals is provided by providing an annular groove in the periphery of the shank, and providing a resilient O-ring to be seated in the said groove.

7. The invention as set forth in claim 5, in a combination in which both of the seals are provided by providing annular grooves in the periphery of the shank, and providing a resilient O-ring to be seated in each of said grooves.

8. The invention as set forth in claim 1, in a combination in which the housing body means has an outer face, and the housing body means' passageway is provided by a hole extending to the outer face of the housing body means, and a ball, being of a size to seal the said hole, is inserted into the said hole from exteriorly of the said housing body means' outer face, operatively sealing the hole, and thus blocking passage of any fluid flowing from the downstream end opening of the housing body means' intermediate outlet means into the housing body means' passageway, except to the shank's said transversely-extending passageway for delivery out the shank's outlet passageway.

9. The invention as set forth in claim 8, in a combination in which the said housing body means has an outer face, and the housing body means' passageway hole has a portion at and adjacent the housing body means' outer face, and an inner portion not adjacent the housing body means' outer face, and the said housing body means' passageway hole is provided, in the said hole portion at and adjacent the outer face of the housing body means, to be of a size larger than the inner portion of the hole, the hole having an outwardly-facing hole shoulder located inwardly of the housing body means' outer face, the shoulder being of a size to block passage of the ball inwardly of the shoulder even though the hole outwardly of the shoulder permits the ball to be inserted into the hole portion at and adjacent the housing body means' outer face, the shoulder being located, with respect to said outer face, between the said outer face and the intersection of the hole with the downstream end of the housing body means' intermediate outlet means, and the shoulder as thus located blocking entrance of the ball into the hole so far inwardly as would block the flow, in the housing body means' passageway inwardly toward the housing body means' outlet means, from the downstream end of the housing body means' intermediate outlet means.

10. The invention as set forth in claim 9, in which the ball is operatively seated against the said shoulder in achieving its said fluid-blocking function.

11. The invention as set forth in claim 1, in a combination in which the means holding the rotor body axially with respect to the housing body means includes compression means carried by the housing body means operatively engageable with the rotor body and urging it in an upstream direction and blocking movement of the rotor body in a downstream direction relatively to the housing body means, and compression means carried by the shank, operatively engageable with the housing body means, blocking the axial extent to which the rotor body can move in the upstream direction relative to the housing body means.

12. The invention as set forth in claim 11, in a combination in which the compression means carried by the shank comprises the provision of an annular groove in the shank, and a snap ring seated in the said groove.

13. The invention as set forth in claim 12, in a combination in which there is provided an operatively lubricative ring member sleeved on the shank between the snap ring and the adjacent portion of the housing body means.

14. The invention as set forth in claim 13, in which the ring member is provided from nylon.

15. A flow selector device, comprising, in combination, a housing body means provided with an inlet means and an outlet means, a rotor body supported by the housing body means to be rotationally movable with respect thereto, and there being means holding the rotor body axially with respect to the housing body means, the support of the rotor body being such as to provide an optionally selectable setting of a plurality of optionally selectable rotor body settings, each of the settings providing a certain flow of fluid from the outlet means of the housing body means;

a selector control for rotating the rotor body about a rotor body axis in rotational movement relative to the housing body means to an optionally selected one of the plurality of rotor body settings, to achieve selectively-desired flow from the outlet means of the housing body means, the rotor body being provided with a passageway extending through the rotor body, in the direction of the said rotor body axis, and the rotor body's passageway having an inlet and an outlet, the inlet of such rotor body's passageway being open to the housing body means' inlet means, and the outlet of the rotor body's passageway being communicative with the housing body means' outlet means, and there being metering means provided for the rotor body's passageway, for achieving the selectively-desired flow by metering flow of fluid through the rotor body's passageway, depending on the position of the rotor body relative to the housing body means, the rotor body including a shank extending outwardly of the housing body means and operatively concentric with the axis of rotation of the rotor body, the housing body means being provided with a passageway communicating with the downstream end of the rotor body's passageway's outlet, and in which the means holding the rotor body axially with respect to the housing body means includes compression means carried by the housing body means operatively engageable with the rotor body and urging it in an upstream direction and blocking movement of the rotor body in a downstream direction relatively to the housing body means, and compression means carried by the shank, operatively engageable with the housing body means, blocking the axial extent to which the rotor body can move in the upstream direction.

16. The invention as set forth in claim 15, in a combination in which the compression means carried by the shank comprises the provision of an annular groove in the shank, and a retainer ring seated in the said groove.

17. The invention as set forth in claim 16, in a combination in which there is provided an operatively lubricative ring member sleeved on the shank between the retainer ring and the adjacent portion of the housing body means.

18. The invention as set forth in claim 17, in which the ring member is provided from nylon.

19. A flow selector device, comprising, in combination,
- a housing body means provided with an inlet means and an outlet means, and an intermediate outlet means intermediate the inlet means and the outlet means, the said housing body means' intermediate outlet means having an upstream end and a downstream end, each of the said upstream end and downstream end having an opening,
- a rotor body supported by the housing body means to be rotationally movable with respect thereto, and there being means holding the rotor body axially with respect to the housing body means,
- the support of the rotor body being such as to provide an optionally selectable setting of a plurality of optionally selectable rotor body settings, each of the settings providing a certain flow of fluid from the intermediate outlet means of the housing body means;
- a selector control for rotating the rotor body about a rotor body axis in rotational movement relative to the housing body means to an optionally selected one of the plurality of rotor body settings, to achieve selectively-desired flow from the intermediate outlet means of the housing body means,
- the rotor body being provided with a metering passageway extending through the rotor body means in the direction of said rotor body axis, and having an inlet and an outlet,
- the inlet of such rotor body's metering passageway being open to the housing body means' inlet means, and the outlet of the rotor body's metering passageway being communicative with the upstream end of the housing body means' intermediate outlet means,
- there being metering means provided for the rotor body's metering passageway, for achieving the selectively-desired flow by metering flow of fluid through the rotor body's passageway, depending on the position of the rotor body relative to the housing body means,
- the rotor body including a shank extending outwardly of the housing body means and operatively concentric with the axis of rotation of the rotor body,
- the downstream end of the housing body means' intermediate outlet means being at an offset location with respect to said rotor body axis,
- the housing body means being provided with a housing body means' passageway extending in the housing body means transversely to the said rotor body axis, and communicating with the downstream end opening of the housing body means' intermediate outlet means, and providing the outlet means for the housing body means,
- the shank being provided with a passageway extending transversely to the rotor body axis,
- one of the housing body means and the shank being provided with a circumferentially-extending annular groove operatively communicating the housing body means' said passageway with the shank's said passageway regardless of the rotational position of the rotor body and its shank's said passageway,
- and the shank is provided an outlet passageway communicating with the shank's said transversely-extending passageway and operatively concentric with the shank and the rotor body, and the rotor body's axis of movement, and providing an outlet for the flow selector device operatively concentric with the axis of rotation of the rotor body.

20. The invention as set forth in claim 19, in a combination in which the annular groove is fully circumferentially continuous.

21. The invention as set forth in claim 19, in a combination in which the shank is the one which is provided with the said annular groove.

22. The invention as set forth in claim 21, in a combination in which the annular groove is fully circumferentially continuous along the periphery of the said shank.

23. The invention as set forth in claim 19, in a combination in which a pair of seals are provided between and operatively sealing the adjacent faces of the shank and the housing body means, one seal on each side of the said annular groove.

24. The invention as set forth in claim 23, in a combination in which at least one of the seals is provided by providing an annular groove in the periphery of the shank, and providing a resilient O-ring to be seated in the said groove.

25. The invention as set forth in claim 23, in a combination in which both of the seals are provided by providing annular grooves in the periphery of the shank, and providing a resilient O-ring to be seated in each of said grooves.

26. The invention as set forth in claim 19, in a combination in which the housing body means has an outer face, and the housing body means' passageway is provided by a hole extending to the outer face of the housing body means,
and a ball, being of a size to seal the said hole, is inserted into the said hole from exteriorly of the said housing body means' outer face, operatively sealing the hole, and thus blocking passage of any fluid flowing from the downstream end opening of the housing body means' intermediate outlet means into the housing body means' passageway, except to the shank passageway for delivery out the shank's outlet passageway.

27. The invention as set forth in claim 26, in a combination in which the said housing body means has an outer face, and the housing body means' passageway hole has a portion at and adjacent the housing body means' outer face, and an inner portion not adjacent the housing body means' outer face, and the said housing body means' passageway hole is provided, in the said hole portion at and adjacent the outer face of the housing body means, to be of a size larger than the inner portion of the hole, the hole having an outwardly-facing hole shoulder located inwardly of the housing body means' outer face, the shoulder being of a size to block passage of the ball inwardly of the shoulder even though the hole outwardly of the shoulder permits the ball to be inserted into the hole portion at and adjacent the housing body means' outer face, the shoulder being located, with respect to said outer face, between the said outer face and the intersection of the hole with the downstream end of the housing body means' intermediate outlet means, and the shoulder as thus located blocking entrance of the ball into the hole so far inwardly as would block the flow, in the housing body means' passageway inwardly toward the housing body means' outlet means, from the downstream end of the housing body means' intermediate outlet means.

28. The invention as set forth in claim 27 in which the ball is operatively seated against the said shoulder in achieving its said fluid-blocking function.

29. A fluid communication device, comprising:

a body member provided with an inlet, an outlet, and an intermediate outlet which is intermediate the said inlet and outlet, the intermediate outlet having an upstream end and a downstream end, the downstream end of the body members' intermediate outlet being spaced from the said body member's outlet, and the body member is provided with a passageway extending from the downstream end of the body member's intermediate outlet, and communicating with the body member's outlet, the said body member's passageway being provided by a hole extending to an outer face of the said body member remote from said body member's outlet, and a ball, being of a size to seal the said hole, is inserted into the said hole from exteriorly of the said body member's outer face, operatively sealing the hole, and thus blocking passage of any fluid flowing from the downstream end of the body member's intermediate outlet into the body member's passageway, except to the body member's outlet.

30. The invention as set forth in claim 29, in a combination in which the said body member's passageway hole has an inner portion not at or adjacent the body member's outer face; and the hole is provided, in the portion adjacent the outer face of the body member to have an outwardly-facing hole shoulder located inwardly of the body member's outer face, the shoulder being of a size to block passage of the ball inwardly of the shoulder even though the hole outwardly of the shoulder permits the ball to be inserted into the hole portion at and adjacent the body member's outer face.

* * * * *